(12) United States Patent
Dalvi et al.

(10) Patent No.: US 10,136,102 B2
(45) Date of Patent: Nov. 20, 2018

(54) ONLINE CONFERENCE BROADCAST USING BROADCAST COMPONENT

(71) Applicant: Microsoft Technology Licensing, LLC, Redmond, WA (US)

(72) Inventors: Adit Dalvi, Seattle, WA (US); Uladzimir Skuratovich, Redmond, WA (US); Marius Ungureanu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/142,318

(22) Filed: Apr. 29, 2016

(65) Prior Publication Data

US 2017/0318261 A1 Nov. 2, 2017

(51) Int. Cl.
*H04N 7/15* (2006.01)
*G06T 19/00* (2011.01)
*H04L 29/06* (2006.01)
*H04N 21/2365* (2011.01)
*H04N 21/4788* (2011.01)
(Continued)

(52) U.S. Cl.
CPC ............ *H04N 7/155* (2013.01); *G06T 19/006* (2013.01); *H04L 12/1822* (2013.01); *H04L 65/403* (2013.01); *H04L 65/602* (2013.01); *H04N 21/2365* (2013.01); *H04N 21/4788* (2013.01); *H04N 21/858* (2013.01)

(58) Field of Classification Search
USPC ....................................................... 348/14.08
See application file for complete search history.

(56) References Cited

U.S. PATENT DOCUMENTS 8,607,288 B2  12/2013  Abdolsalehi
8,908,005 B1  12/2014  Leske et al.
(Continued)

FOREIGN PATENT DOCUMENTS

KR  20130021244 A  3/2013

OTHER PUBLICATIONS

Stelzner, Michael, "How to Conduct a Live Video Broadcast with Multiple Talking Heads", Published on: Dec. 8, 2009 Available at: http://www.socialmediaexaminer.com/how-to-conduct-a-live-video-broadcast-with-multiple-talking-heads/.
(Continued)

*Primary Examiner* — Amal Zenati
(74) *Attorney, Agent, or Firm* — Workman Nydegger (57) ABSTRACT

An online conferencing system that provides an automatic mechanism to broadcast an online conference. A video gathering component gathers video streams for each of at least some of the current participants in the online conference. A broadcast start triggering component allows one or more of the participants to trigger operation of a broadcasting component. The broadcast component that, when triggered, causes a resulting video stream comprising at least a composite of at least some of the gathered video streams to be published to a plurality of viewers. In some embodiments, pre-processing of the video streams to create the resulting video stream also occurs. Such pre-processing could include, for instance, composing a stream from multiple video streams, altering one or more of the video streams, applying augmented reality to the video stream, and so forth.

20 Claims, 4 Drawing Sheets

(51) Int. Cl.
*H04N 21/858* (2011.01)
*H04L 12/18* (2006.01)

(56) References Cited

U.S. PATENT DOCUMENTS

| | | | | |
|---|---|---|---|---|
| 9,001,178 | B1* | 4/2015 | Leske | H04N 7/155 |
| | | | | 348/14.08 |
| 9,030,523 | B2 | 5/2015 | Talukder | |
| 9,055,189 | B2* | 6/2015 | Su | H04L 12/1827 |
| 9,294,725 | B1* | 3/2016 | Drugge | G06Q 50/01 |
| 2013/0021244 | A1 | 1/2013 | Kuge | |
| 2014/0240444 | A1 | 8/2014 | Szymczyk et al. | |
| 2016/0119413 | A1* | 4/2016 | Antipa | H04L 67/104 |
| | | | | 709/204 |
| 2016/0142782 | A1* | 5/2016 | Pizzurro | H04N 21/812 |
| | | | | 725/5 |

OTHER PUBLICATIONS

Rao, Leena, "Tinychat Launches Live Video Streaming Portal to Take on Ustream and Stickam", Published on: Nov. 16, 2009 Available at: http://techcrunch.com/2009/11/16/tinychat-launches-live-video-streaming-portal-to-take-on-ustream-and-stickam/.

"Video Broadcasting Services", Retrieved on: Oct. 6, 2015 Available at: http://www.kushaltech.com/search.html?ss=Video%20Broadcasting%20Services.

Devinder, "12 Best Skype Alternatives for VoIP, Video Calls and Conferencing", Published on: Feb. 28, 2014 Available at: http://beebom.com/2014/02/skype-alternatives-2014.

Hill, Angie, "Skype Delivers a New Solution for Broadcasters", Published on: Apr. 7, 2014 Available at: http://blogs.skype.com/2014/04/07/skype-delivers-a-new-solution-for-broadcasters/.

"What is a Skype Meeting Broadcast?", Retrieved on: Oct. 5, 2015 Available at: https://support.office.com/en-us/article/What-is-a-Skype-Meeting-Broadcast-c472c76b-21f1-4e4b-ab58-329a6c33757d.

"Free Online Video Chat", Published on: Dec. 8, 2014 Available at: http://www.vanillashow.com/.

"Get started with Hangouts on Air", Published on: Mar. 15, 2015 Available at: https://support.google.com/plus/answer/2553119?hl=en.

Lussier, Nathalie, "How to Host a Google Hangout on Air", Published on: Jun. 4, 2014 Available at: http://www.socialmediaexaminer.com/google-hangout-on-air-tips/.

"Top 5 Free Video Chat Software for Groups up to 12 People", Retrieved on: Oct. 5, 2015 Available at: http://www.freemake.com/blog/top-video-chat-software-for-video-calls-with-up-to-25-people/.

Jules, et al., "Top 10 Live Video Streaming Sites to Broadcast and Watch Events Online", Published on: Apr. 24, 2013 Available at: http://www.quertime.com/article/top-10-live-video-streaming-sites-to-broadcast-and-watch-events-online/.

International Search Report and the Written Opinion issued in PCT Patent Application PCT/US2017/029497 dated Jul. 10, 2017.

* cited by examiner

ONLINE CONFERENCE BROADCAST USING BROADCAST COMPONENT

BACKGROUND

Computers and networks have ushered in new opportunities of social networking and collaboration. One form of such network is referred to as an "online conference". Early online conferencing took the form of video conferencing that required dedicated equipment, cameras, and so forth. More recently, online conferencing may be performed on almost any computing system. Applications are now offered by a variety of venders whereby a user can participate in an online conference by viewing video and audio of other participants, sharing collaborative work areas, chatting, and so forth, via a web site.

A typical online conferencing application provides a user interface that includes an online conferencing area, which includes a visualized representation of each participant. A contacts area of the user interface illustrates visualized representations of various individuals that might join into an online conference. Once in an online conference, individuals may communicate using video, audio, and other multi-media mechanisms. The communications that support the conferencing can take the form of Internet Protocol (IP) packets, and thus may be freely communicated over the Internet.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to an online conferencing system that provides an automatic mechanism to broadcast an online conference upon being triggered. A video gathering component gathers video streams for each of at least some of the current participants in the online conference. A broadcast start triggering component allows one or more of the participants to trigger operation of a broadcasting component. The broadcast component, when triggered, causes a resulting video stream comprising at least a composite of at least some of the gathered video streams to be published to a plurality of non-participant viewers. In some embodiments, pre-processing of the video streams to create the resulting video stream also occurs. Such pre-processing could include, for instance, composing a stream from multiple video streams, altering one or more of the video streams, applying augmented reality to the video stream, and so forth.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to an online conferencing system that provides an automatic mechanism to broadcast an online conference upon being triggered. A video gathering component gathers video streams for each of at least some of the current participants in the online conference. A broadcast start triggering component allows one or more of the participants to trigger operation of a broadcasting component. The broadcast component, when triggered, causes a resulting video stream comprising at least a composite of at least some of the gathered video streams to be published to a plurality of non-participant viewers. In some embodiments, pre-processing of the video streams to create the resulting video stream also occurs. Such pre-processing could include, for instance, composing a stream from multiple video streams, altering one or more of the video streams, applying augmented reality to the video stream, and so forth.

Some introductory discussion of a computing system will be described with respect to FIG. 1. Then, the system for efficiently triggering actions with respect to an online conversation will be described with respect to FIG. 2 through FIG. 5.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
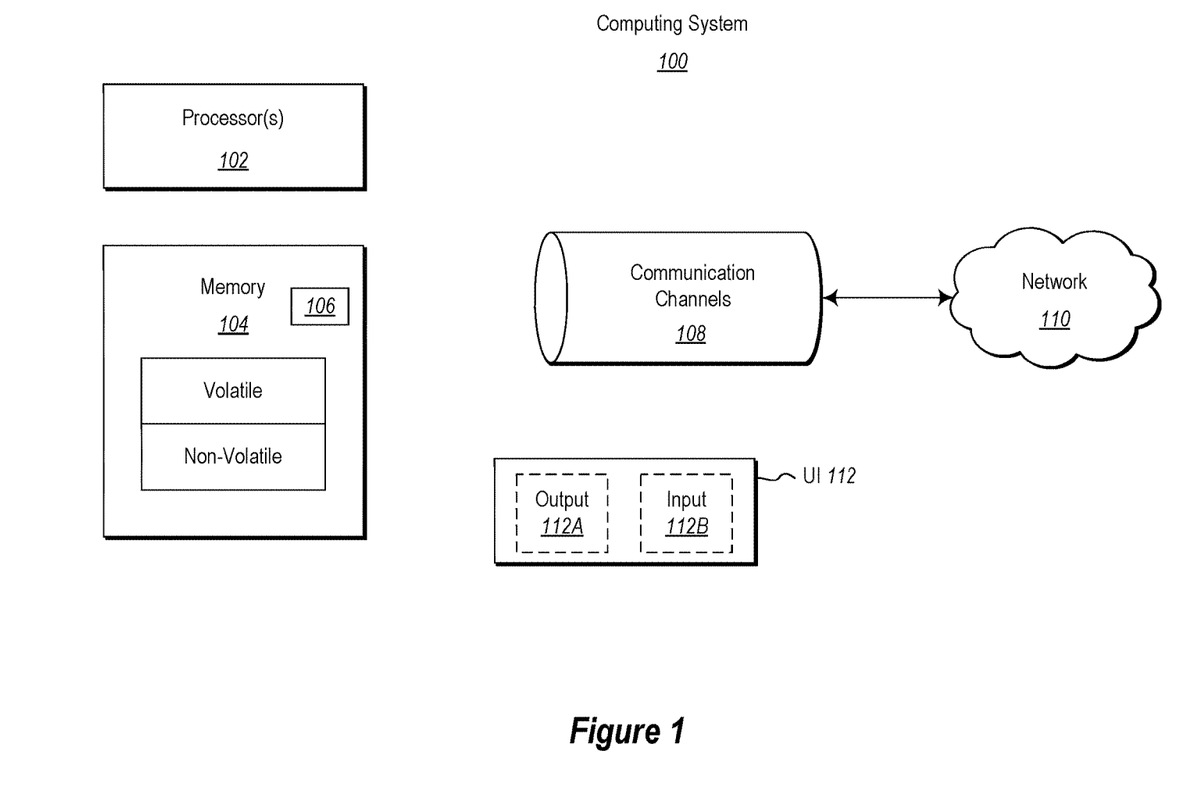
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
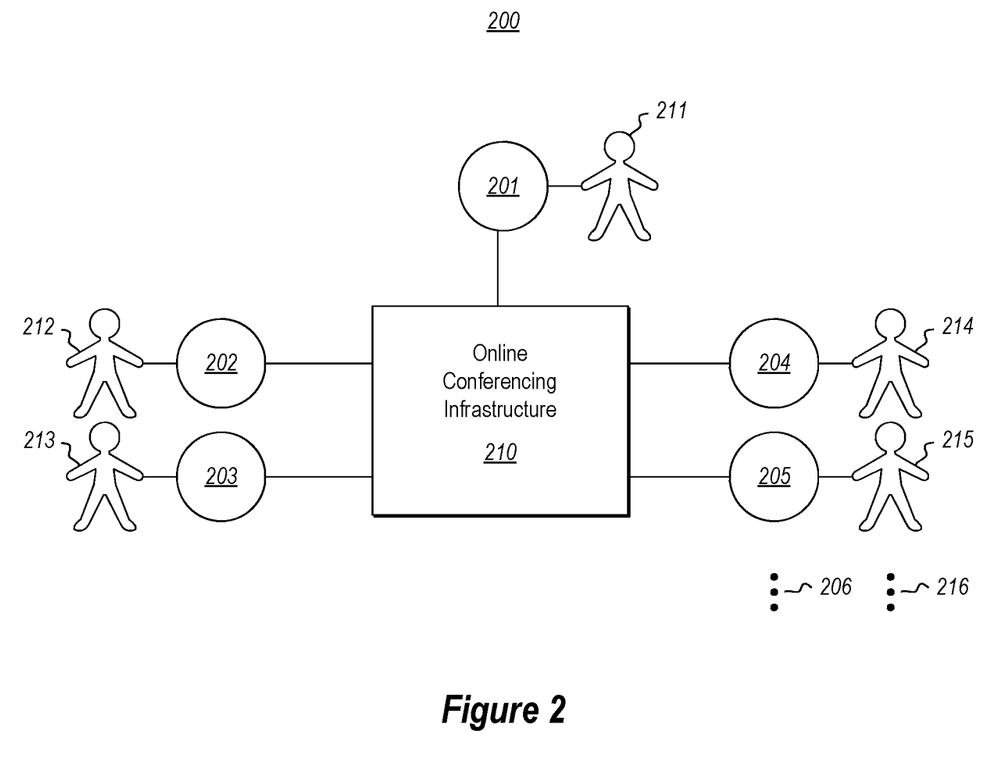
FIG. 2 illustrates an online conferencing environment in which the principles described herein may be employed, which includes multiple participants using corresponding participant computing systems to engage in the online conference using an online conferencing infrastructure.

FIG. 2 illustrates an online conferencing environment 200 in which the principles described herein may be employed. The online conferencing environment 200 includes multiple participant computing systems that participants use to engage in the online conference. The online conference environment 200 also potentially also include an online conferencing infrastructure 210. The online conferencing environment 200 may include dedicated computing systems that facilitate the online conference. For instance, the online conferencing environment 200 may be an online conferencing service that is implemented in a cloud computing environment or in some other remote network.

In the example of FIG. 2, there are five participant computing systems 201 through 205 involved in an online conference. However, the ellipses 206 represent that there may be any multiple number of participant computing systems engaged in any given online conference via the online conferencing infrastructure 210. In fact, one of the benefits of online conferencing is that any number of participants may participate, and participants may drop off and join at any time. The participant computing systems 201 through 205 may each be structured as described above for the computing system 100 of FIG. 1, and include user interface systems as described above for the user interface system 112 of FIG. 1. Each of the participant computing systems 201 through 205 has an associated participant user 211 through 215, respectively. The ellipses 216 again represents that there may be further participant users associated with yet other computing systems represented by the ellipses 206. Furthermore, there may be multiple users engaged with a single participant computing system, and a single user engaged with multiple participant computing systems.

Figure 3:
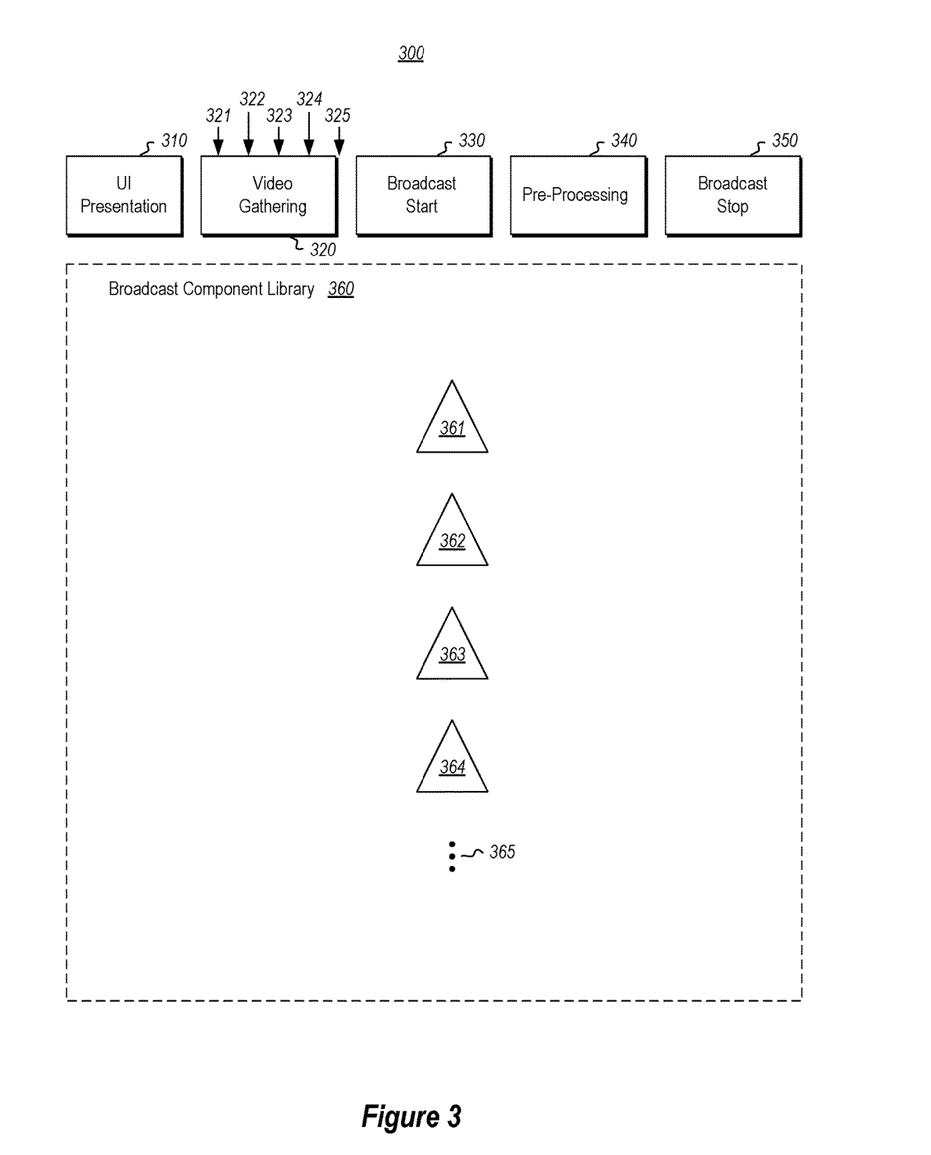
FIG. 3 schematically illustrates an online conferencing system that may operate within the online conferencing environment of FIG. 2, and which includes various executable components including a user interface presentation component, a video gathering component, a broadcast start triggering component, a pre-processing component, a broadcast stop triggering component, and a library of broadcast components, each of which enabling broadcasting of an online conference when triggered.

FIG. 3 schematically illustrates an online conferencing system 300 that may operate within the online conferencing environment 200 of FIG. 2. The online conferencing system 300 includes various executable components including a user interface presentation component 310, a video gathering component 320, a broadcast start triggering component 330, a pre-processing component 340, and a broadcast stop trigger component 350. The system 300 also includes a library 360 of broadcast components that, when executed, broadcast the online conference in some way, and each being triggerable by a triggering component (such as the broadcast start triggering component 330) to thereby publish at least some of the gathered video streams to multiple viewers. The library 360 of broadcast components are illustrated as including four executable components 361, 362, 363 and 364, though the ellipses 365 represent that there may be any number of the broadcast components within the library. Each of the components 310, 320, 330, 340, 350, 361, 362, 363 and 364 may be structured as described above for the executable component 106 of FIG. 1.

The user interface presentation component 310 causes a user interface that represents the online conference to be presented on a display of each of the participant computing systems 201 through 205 for presentation to the corresponding participants 211 through 215. In some embodiments, the broadcast component is triggered to execute by joining a visualization of the broadcast component into an online conference very much like a participant would be joined into the online conference. For instance, a visualization of a broadcast component may be presented within a contacts list of the user interface along with other broadcast components and other potential participants in the online conference. If the user adds a participant to the online conference by dragging a copy of a contact representing a participant into an online conference portion of the user interface, then broadcasting of the online conference may likewise be initiated by dragging a copy of the contact representing the broadcast component into the online conference portion of the user interface.

The video gathering component 320 gathers video streams for each of at least some of the current participants in the online conference. In the example of FIG. 3, the video gathering component 320 is illustrated as gathering five video streams 321 through 325. These video streams may correspond to, for instance, the video streams produced by the participant computing systems 201 through 205 in response to interaction with the participants 211 through 215, respectively.

The broadcast start triggering component 330 allows one or more participants in the online conference to trigger operation of a broadcast component. As an example only, as previously mentioned, a broadcast component may be triggered to operate by dragging and dropping a visualization of the broadcast component from a contacts list into an online conference portion of a user interface. An alternative would be to issue a broadcast triggering command in the chat window by any of the participants. For example, a participant can type "/startbroadcast" in the chat window as a broadcast triggering command.

The pre-processing component 340 may perform pre-processing of one or more or all of the gathered video streams prior to broadcasting to form a resulting video stream that is to be published. Various examples of such pre-processing are described below. However, one example is the compositing of multiple or all of the gathered video streams into a single video stream for broadcasting.

The broadcast stop trigger component 350 causes the broadcast to stop by stopping operation of the broadcast component. This may be caused by one or more of the participants in the online conference interfacing with the user interface of their corresponding participant computing system. As an example only, a broadcast component may be triggered to stop broadcasting by removing the broadcast component from the conference participant list. An alternative would be to issue a broadcast stop command in the chat window by any of the participants. For example, a participant can type "/stopbroadcast" in the chat window as a broadcast triggering command. Alternatively or in addition, this may occur automatically upon the occurrence of one or more events and/or the satisfaction of certain conditions, such as, perhaps the arrival of a particular time, or the end of the online conference itself The video gathering component 320, the broadcast start triggering component 330, the pre-processing component 340, and the broadcast stop trigger component 350 may be executed on the online conferencing infrastructure 210 or may be distributed between the online conferencing infrastructure 210 and a participating computing system. Likewise, the broadcast component library 360 may be present on the online conferencing infrastructure 210. If that online conferencing infrastructure is at a location where processing is plentiful, such as in a cloud computing environment or another location remote from the participants that is especially suited for processing, the broadcast components may have expanded processing capability and execute complex broadcast functionality including perhaps extensive pre-processing.

Figure 4:
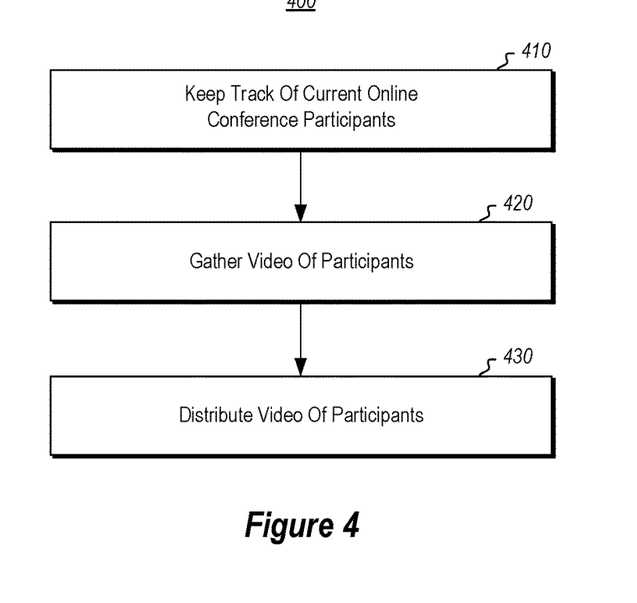
FIG. 4 illustrates a flowchart of a method for conducting an online conference in which multiple video streams are gathered from participant computing systems and correspondingly distributed to participant computing systems.

FIG. 4 illustrates a flowchart of a method 400 for conducting an online conference. The method may be performed by, for instance, the online conferencing infrastructure 210. While keeping track of the current online conference participants (act 410), video streams are gathered associated with at least some of the participants in the conference (act 420). For instance, in FIG. 3, the video gathering component 320 gathers video from the various participant computing systems (e.g., participant computing systems 201 through 205 of FIG. 2) that are providing video as part of the online conference. Although video is mentioned as an example of multi-media content that is gathered, the principles described herein may apply to any gathered multi-media content, such as video, audio, chat, combinations thereof, and so forth.

At least some of those gathered video streams are distributed to other participants in the conference (act 430). Note that the distribution of the video streams to the other participants is distinct from the broadcast of the online conference to individuals (also called herein "viewers") who are not participating in the online conference via providing video of their own.

Figure 5:
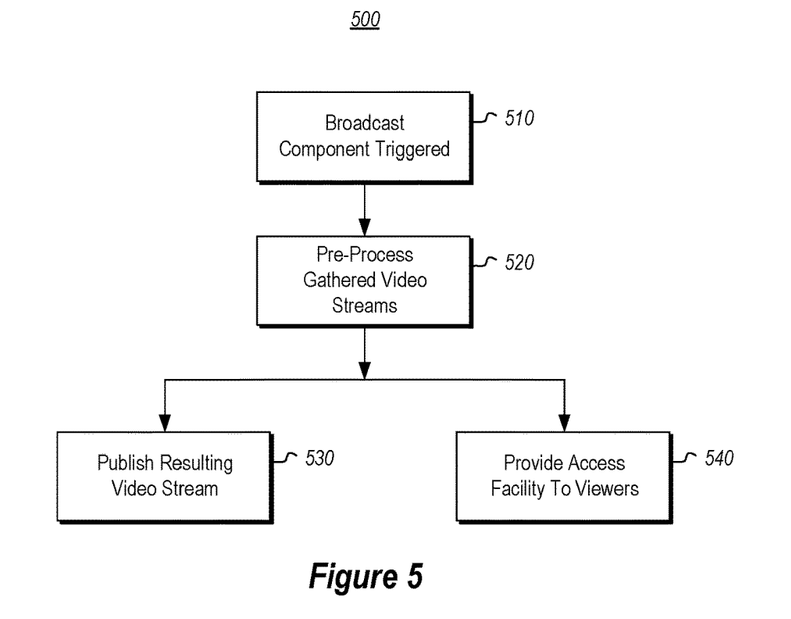
FIG. 5 illustrates a flowchart of a method for broadcasting an online conference by triggering a broadcast component.

FIG. 5 illustrates a flowchart of a method 500 for broadcasting an online conference. The method 500 may be performed by, for instance, the online conferencing infrastructure 210 when the online conferencing infrastructure is performing the method 400 of conducting the online conference.

The method 500 is initiated upon detecting that a broadcast component has been triggered (act 510). This detection may be performed by, for instance, the broadcast start triggering component 330 of FIG. 3. For instance, the broadcast start triggering component 330 may execute a broadcast component in response to use interaction with a user interface, such as perhaps the user dragging a visualization of the broadcast component from a contacts list into an online conferencing portion of a user interface.

Next, the pre-processing component 340 performs pre-processing of the video streams that are to be broadcast (act 520). An example of such pre-processing might be the composing of a single video stream representative of all the video streams put together. As circumstances change (e.g., the set of video streams changes, as the current active speaker changes, and/or as the number of participants within a particularly video stream change) then the broadcast composite video stream may likewise change by dynamically adjusting the boundaries between each video stream.

The pre-processing component 340 might be selective in which videos streams to broadcast and/or what time scope of each video stream to broadcast. For instance, the time scope may not necessarily begin when a new participant joins an online conference, or when the broadcasting of the online conference begins. Likewise, the time scope may end prior to the online conference ending, prior to the participant leaving, and prior to the end of the broadcast of the online conference. As an example, perhaps the broadcast is in speaker form in which only the video from the current speaker is broadcast, with the broadcast component changing from one video stream to another as the speaker changes. Perhaps if multiple people are speaking simultaneously, the video streams from the simultaneous speakers are both broadcast perhaps in composite form. Thus, as the dynamics of the conversation change, there could be dynamic changes in the broadcast in terms of what video stream(s) is/are broadcast, and how the video streams are composed in the broadcast. In any case, the broadcast may, for any given video stream, be limited to less than all of the entire video stream for the online conference.

The pre-processing component 340 may perform other types of processing as well such as actually altering the video stream prior to recording the video stream. For instance, the recording component may add augmented reality to the video stream. For instance, perhaps the head of the speaker may be enlarged somewhat or an arrow appears above the speaker to visually emphasize who is currently speaking. Facial recognition technology may also be employed to apply text over the video of a person identifying who the person is, or to detect micro-expressions that reveal emotions. Controls may also be provided so that individuals may be selected to find out more about the person, and so forth. Themes may be applied to the video. For instance, the video may be turned into a cartoon by quantizing color, smoothing edges, determining locations of focal features (eyes, noses, mouths) and replacing with cartoonish features, and so forth.

In response to the triggering of the broadcast component (act 510), and after appropriate pre-processing for that broadcast component (act 520), the broadcast component causes a resulting video stream to be published to multiple viewers (act 530). For instance, a composite of multiple video streams created by the pre-processing component 340 may be broadcast to the viewers.

The principles described herein are not limited to the manner in which the resulting video stream is published to the multiple viewers. In fact, there may be a variety of broadcast components that each have distinct manners of pre-processing and/or publication of the resulting video stream. As an example, the broadcast component may provide the resulting video stream to a location associated with a link, such as a website, such as a social networking website.

In addition, if the viewers are not already provided with the facility to access the resulting video stream at the location, then the broadcast component also provides the facility for at least some of the recipient viewers to receive the resulting video stream. As an example, the provided facility may be an identification of the location to which the resulting video stream is published, such as a link to the location to which the resulting video stream is published. Alternatively or in addition, the provided facilitate to access the location may include one or more credentials for allowing access to the resulting video stream. The provided facility for accessing the location may be communicated via chat communication, such as chat communication that is embedded within the online conferencing infrastructure 210, e-mail communication, or any other automatic mechanism.

In order to broadcast, there may be a notification to the other participants that the online conference (or a portion thereof) is being broadcast. Alternatively or in addition, the consent of the other participants for broadcasting may be sought and received for broadcast of the online conference (or portion thereof). The online conferencing infrastructure 210 may be used to communication such notifications, requests for consent and/or consent.

As described above, there is an almost infinite variety of ways that a broadcast component may broadcast, either by default, or through further selection by a user that triggers the broadcast component. There may be different broadcast components that may be triggered to pre-process and/or broadcast in distinct ways by, for instance, broadcasting by default in different ways, or having various ways to vary from the default settings. For instance, in FIG. 3, there are four broadcasting components 361 through 364 shown. Each broadcast component 361 through 364 may broadcast in distinct ways. For instance, broadcast component 361 may simply gather all video provided in the online conference, and broadcast as a composite video, and publish the composite view to a website while providing credentials to certain viewers via e-mail. Also as an example only, the broadcast component 362 may change broadcast video streams quickly depending on who is speaking, publish the composite video also to the same website while providing credentials to a different set of viewers via chat correspondence. Also as an example, the broadcast component 353 might apply augmented reality by placing a quote bubble above the speaker with the text of the words spoken placed within the quote bubble (e.g., for the hearing impaired). As a final example, the broadcast component 364 might apply augmented reality by pre-processing all video to appear as a cartoon, publishing to a social network website, and then e-mailing each view a link to the social network website.

Accordingly, the principles described herein provide an efficient mechanism to perform automated broadcasting of an online conference in a manner that a variety of broadcast choices (including options for pre-processing, broadcasting, and notification of the various viewers) are available, without being restricted by processing power.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An online conferencing system comprising:
    a user interface configured to present:
        an online conference interface for display at each of a plurality of conference participant computing systems; and
        a contact list comprising:
            a plurality of participant contacts representing a plurality of potential conference participants; and
            a plurality of broadcaster contacts, each broadcaster contact associated with a particular broadcaster being selected from a broadcaster library and including properties configured to modify the online conference in a particular way, wherein the contact list is a single user interface element that includes both the plurality of participant contacts and the plurality of broadcaster contacts within the single user interface element;
    a video gatherer configured to gather video streams for each of at least some of a plurality of current participants in the online conference;
    a broadcast starter configured to trigger operation of one or more of the plurality of broadcasters within the online conference interface when a particular broadcaster contact is added to the online conference interface from the contact list;
    wherein, the system is configured to, in response to a particular broadcaster contact being added to the online conference interface, publish a resulting video stream comprising a composite of at least some of the gathered video streams to a plurality of viewers according to properties of the particular broadcaster associated with the particular broadcaster contact.

2. The online conferencing system in accordance with claim 1, further comprising:
    a pre-processor configured to processes at least some of the gathered video streams to form the resulting video stream that is to be published by a broadcaster.

3. The online conferencing system in accordance with claim 2, wherein the pre-processor is configured to composite video for multiple of the plurality of current participants together.

4. The online conferencing system in accordance with claim 2, wherein the pre-processor is configured to add visual emphasis to at least a portion of the plurality of current participants.

5. The online conferencing system in accordance with claim 2, wherein the pre-processor is configured to apply augmented reality to the video stream to at least a portion of the plurality of current participants.

6. The online conferencing system in accordance with claim 1, wherein at least one broadcaster is further configured to cause the resulting video stream to be published by providing the resulting video stream to a location associated with a link or a web site.

7. The online conferencing system in accordance with claim 6, the web site being a social networking location.

8. The online conferencing system in accordance with claim 1, wherein at least one broadcaster is further configured to provide a facility for at least some of the viewers to receive the resulting video stream.

9. The online conferencing system in accordance with claim 8, the provided facility for at least one of the viewers comprising one or more credentials that allow access to the resulting video stream.

10. The online conferencing system in accordance with claim 8, wherein at least one broadcaster is configured to provide the facility via a chat communication embedded within the online conferencing system.

11. The online conferencing system in accordance with claim 8, wherein at least one broadcaster is configured to provide the facility via an e-mail communication.

12. The online conferencing system in accordance with claim 1, further comprising:
a stopper configured to allow one or more of the participants to stop operation of at least one broadcaster.

13. The online conferencing system in accordance with claim 1, wherein at least one broadcaster is configured to stop a broadcast upon occurrence of one or more conditions.

14. The online conferencing system in accordance with claim 1, wherein:
each of the broadcasters is triggerable by a broadcast starter, and each broadcaster is configured to broadcast in a distinct way from each other, each broadcaster is configured to be triggered by the corresponding broadcast starter being included within the contact list as one of the plurality of broadcaster contacts.

15. The online conferencing system of claim 1, wherein the plurality of broadcasters are included within the contact list as a plurality of broadcast contacts, such that a particular broadcaster can be invoked by adding the associated broadcaster contact from the contact list to the online conference interface.

16. The online conferencing system of claim 15, wherein the user interface is configured to allow a user to invoke a particular broadcaster by dragging the associated broadcaster contact representing the particular broadcaster from the contact list onto the online conference interface.

17. A method, implemented at a host computing system, for broadcasting an online conference, the method comprising:
generating, at the host computing system, a contact list within a user interface of an online conference for display at each of a plurality of conference participant computing systems, the contact list comprising:
a plurality of participant contacts representing a plurality of potential conference participants; and
a plurality of broadcaster contacts representing a plurality of broadcasters selected from a broadcaster library and including properties configured to modify the online conference in a particular way, wherein the contact list is a single user interface element that includes both the plurality of participant contacts and the plurality of broadcaster contacts within the single user interface element;
gathering, at the host system, video streams for each of at least some of a plurality of current participants in the online conference;
receiving, at the host computing system, an indication that a user has invoked a particular broadcaster by selecting the broadcaster contact associated with the particular broadcaster from the contact list and, as a result, adding the broadcaster contact to the online conference interface;
as a result of receiving the indication, triggering, at the host computing system, operation of the particular broadcaster within the online conference interface; and
as a result of the triggering, publishing a resulting video stream comprising at least a composite of at least some of the gathered video streams to a plurality of viewers according to properties of the particular broadcaster.

18. The method of claim 17, wherein the plurality of broadcasters are included within the contact list as a plurality of broadcaster contacts, wherein a participant invokes a particular broadcaster by adding the associated broadcaster contact from the contact list to the online conference interface through a drag and drop interaction.

19. A computer program product comprising one or more computer-readable hardware storage device having thereon computer-executable instructions that are structured such that, when executed by one or more processors of a host computing system, adapt the computing system to performing the following:
present a contact list within an online conference interface on a display of each of a plurality of conference participant computing systems, the contact list comprising:
a plurality of participant contacts representing a plurality of potential conference participants; and
a plurality of broadcaster contacts representing a plurality of broadcasters selected from a broadcaster library and including properties configured to modify the online conference in a particular way, wherein the contact list is a single user interface element that includes both the plurality of participant contacts and the plurality of broadcaster contacts within the single user interface element;
gather video streams, at the host computing system, for each of at least some of a plurality of current participants in the online conference;
enable, at the host computing system, a broadcast starter configured to trigger operation of a particular broadcaster within the online conference interface when the broadcaster contact associated with the particular broadcaster is added to the online conference interface from the contact list; and
in response to receiving a user input indicating that a conference participant has added a particular broadcaster to the online conference interface, publish a resulting video stream comprising at least a composite of at least some of the gathered video streams to a plurality of viewers according to properties of the added broadcaster.

20. The computer program product of claim 19, wherein the plurality of broadcaster are included within the contact list as a plurality of broadcaster contacts, wherein a particular broadcaster is invoked by adding the associated broadcaster contact from the contact list to the online conference interface by dropping the associated broadcaster contact onto the online conference interface.

* * * * *